(12) United States Patent
Rasmussen et al.

(10) Patent No.: US 9,454,186 B2
(45) Date of Patent: Sep. 27, 2016

(54) USER INTERFACE

(75) Inventors: Lene Leth Rasmussen, Copenhagen V (DK); Lutz Abe, Erbach (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/250,538

(22) Filed: Sep. 30, 2011

(65) Prior Publication Data

US 2013/0086513 A1    Apr. 4, 2013

(51) Int. Cl.
*G06F 3/00* (2006.01)
*G06F 1/16* (2006.01)
*G06F 3/0484* (2013.01)
*G06F 3/0486* (2013.01)

(52) U.S. Cl.
CPC ........... *G06F 1/1643* (2013.01); *G06F 1/1647* (2013.01); *G06F 1/1692* (2013.01); *G06F 3/0486* (2013.01); *G06F 3/04842* (2013.01); *G06F 3/04845* (2013.01)

(58) Field of Classification Search
CPC .. G06F 3/0486; G06F 1/1616; G06F 3/1423; G06F 1/1641; G06F 2203/04803; G06F 3/017; G06F 3/04845; G06F 3/04842
USPC .......................... 715/230, 233, 862, 863, 864
See application file for complete search history.

(56) References Cited

U.S. PATENT DOCUMENTS

| | | | |
|---|---|---|---|
| 5,748,189 A * | 5/1998 | Trueblood | 715/755 |
| 5,874,958 A * | 2/1999 | Ludolph | 715/781 |
| 6,545,669 B1 * | 4/2003 | Kinawi et al. | 345/173 |
| 7,752,566 B1 * | 7/2010 | Nelson | 715/769 |
| 8,194,043 B2 | 6/2012 | Cheon et al. | |
| 8,473,870 B2 * | 6/2013 | Hinckley et al. | 715/863 |
| 2005/0270278 A1 | 12/2005 | Ouchi | |
| 2008/0100531 A1 | 5/2008 | Yoshinaga et al. | |

(Continued)

FOREIGN PATENT DOCUMENTS

| | | |
|---|---|---|
| EP | 2 214 088 A2 | 8/2010 |
| EP | 2 299 352 A1 | 3/2011 |

(Continued)

OTHER PUBLICATIONS

Kennemer, Q.; "Sprint's Kyocera Echo to be a Dual-Screen Android [Ultimate Multi-Tasking]"; [Online] Published: Feb. 7, 2011 @ 11:18 a.m.; Retrieved from the Internet <URL: http://phandroid.com/2011/02/07/sprints-kyocera-echo-to-be-a-dual-screen-android-ultimate-multi-tasking/.
Office Action for U.S. Appl. No. 13/250,567; dated Jun. 18, 2013.
International Search Report and Written Opinion for Application No. PCT/IB2012/055212, dated May 14, 2013.

(Continued)

*Primary Examiner* — Wilson Tsui
(74) *Attorney, Agent, or Firm* — Alston & Bird LLP

(57) ABSTRACT

An apparatus comprising: a first display area; a second display area; and an interface separating the first display area from the second display area; and a display controller configured to control display of a user interface element in a first configuration when the user interface element is movable across the interface from the first display area to the second display area and a first criteria dependent upon a distance of the user interface element from the interface is satisfied and is configured to control display of the user interface element in a second configuration, different to the first configuration, when the user interface element is movable across the interface from the first display area to the second display area and the first criteria concerning a distance of the user interface element from the interface is not satisfied.

20 Claims, 2 Drawing Sheets

(56) References Cited

U.S. PATENT DOCUMENTS

| | | |
|---|---|---|
| 2008/0256484 A1 | 10/2008 | Kraft et al. |
| 2009/0201270 A1 | 8/2009 | Pikkujamsa et al. |
| 2009/0322689 A1 | 12/2009 | Kwong et al. |
| 2010/0146422 A1 | 6/2010 | Seong et al. |
| 2010/0188352 A1* | 7/2010 | Ikeda ............... 345/173 |
| 2010/0241979 A1 | 9/2010 | Apted |
| 2010/0245275 A1 | 9/2010 | Tanaka |
| 2011/0109526 A1 | 5/2011 | Bauza et al. |
| 2011/0175920 A1* | 7/2011 | Ieperen ............ 345/473 |
| 2011/0209057 A1 | 8/2011 | Hinckley et al. |
| 2011/0209103 A1 | 8/2011 | Hinckley et al. |
| 2011/0291964 A1 | 12/2011 | Chambers et al. |
| 2012/0162091 A1* | 6/2012 | Lyons et al. ......... 345/173 |
| 2012/0304111 A1* | 11/2012 | Queru ................ 715/784 |

FOREIGN PATENT DOCUMENTS

| | | |
|---|---|---|
| EP | 2 309 369 A1 | 4/2011 |
| WO | WO-02/093543 A1 | 11/2002 |
| WO | WO 2011/057271 A1 | 5/2011 |
| WO | WO-2011/076977 A1 | 6/2011 |
| WO | WO 2011/099720 A2 | 8/2011 |

OTHER PUBLICATIONS

Office Action for U.S. Appl. No. 13/250,633; dated Mar. 1, 2013.
Office Action for U.S. Appl. No. 13/250,633 dated Aug. 29, 2013.
Office Action for U.S. Appl. No. 13/250,493 dated Aug. 26, 2015.
Extended European Search Report from European Patent Application No. 12837203.4 dated Aug. 17, 2015.
Office Action for U.S. Appl. No. 13/250,493 dated Mar. 30, 2016.

* cited by examiner

USER INTERFACE

TECHNOLOGICAL FIELD

Embodiments of the present invention relate to a user interface comprising a first display area and a second display area.

BACKGROUND

A user interface is a man-machine interface by which an apparatus communicates to a user and/or by which a user communicates to the apparatus.

A user interface may comprise one or more displays with distinct display areas.

BRIEF SUMMARY

It would be desirable to use two distinct display areas separated by an interface, such as for example a gap, as a single display area. However, the presence of the gap can make this problematic as it creates an interrupt in the single display area.

According to various, but not necessarily all, embodiments of the invention there is provided an apparatus comprising: a first display area; a second display area; and an interface separating the first display area from the second display area; and a display controller configured to control display in the first display area of a user interface element that is movable across the interface from the first display area to the second display area and to control display of an interface effect, at the interface, indicative to a user that the user interface element is movable across the interface from the first display area to the second display area.

According to various, but not necessarily all, embodiments of the invention there is provided a method comprising: displaying in a first display area a user interface element that is movable from the first display area to a second display area across an interface between the first display area and the second display area; and displaying an interface effect in the first display area, at the interface, indicative to a user that the user interface element is movable across the interface from the first display area to the second display area.

According to various, but not necessarily all, embodiments of the invention there is provided an apparatus comprising: at least one processor; and at least one memory including computer program code the at least one memory and the computer program code configured to, with the at least one processor, cause the apparatus at least to perform: displaying in a first display area a user interface element that is movable from the first display area to a second display area across an interface between the first display area and the second display area; and displaying an interface effect in the first display area, at the interface, indicative to a user that the user interface element is movable across the interface from the first display area to the second display area.

According to various, but not necessarily all, embodiments of the invention there is provided an apparatus comprising: means for displaying in a first display area a user interface element that is movable from the first display area to a second display area across an interface between the first display area and the second display area; and means for displaying an interface effect in the first display area, at the interface, indicative to a user that the user interface element is movable across the interface from the first display area to the second display area.

BRIEF DESCRIPTION

For a better understanding of various examples of embodiments of the present invention reference will now be made by way of example only to the accompanying drawings in which.

Figure 4:
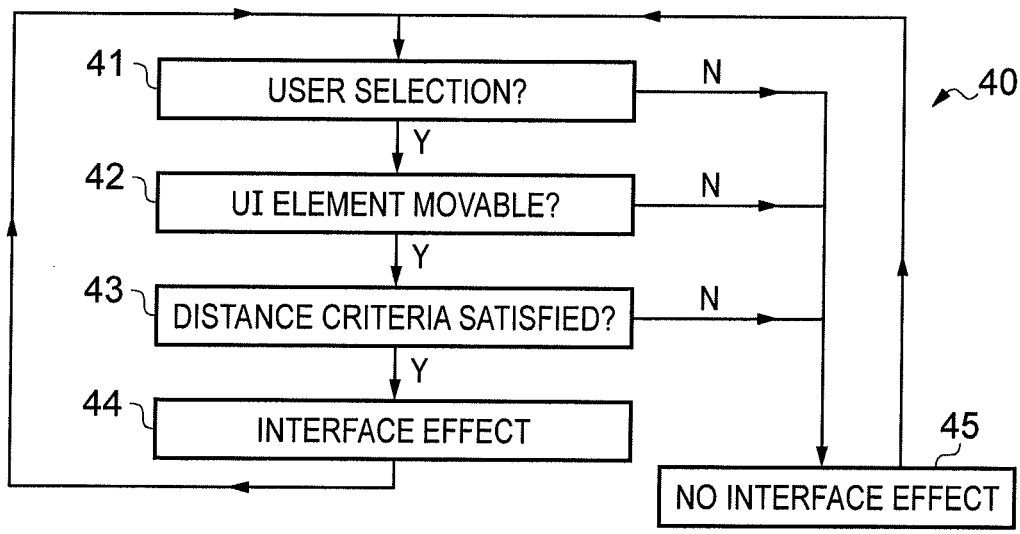
Figure 5:
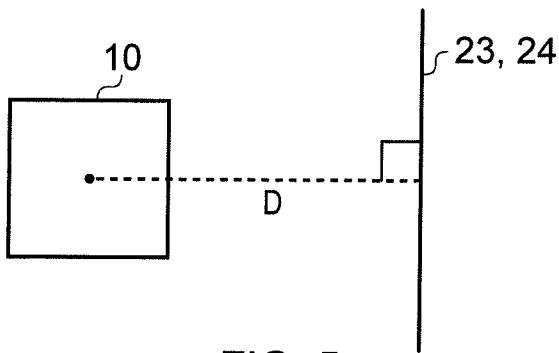

FIG. 4 schematically illustrates a method for controlling whether or not an interface effect is displayed; and FIG. 5 schematically illustrates examples of a criteria concerning a distance of the user interface element from the interface.

DETAILED DESCRIPTION

The Figures illustrate an apparatus 2 comprising: a first display area 21; a second display area 22; and an interface 16 separating the first display area 21 from the second display area 22; and a display controller 6 configured to control display, in the first display area 21, of a user interface element 10 that is movable across the interface 16 from the first display area 21 to the second display area 22 and to control display of an interface effect 14, at the interface 16, indicative to a user that the user interface element 10 is movable by a user across the interface 16 from the first display area 21 to the second display area 22.

Figure 1:
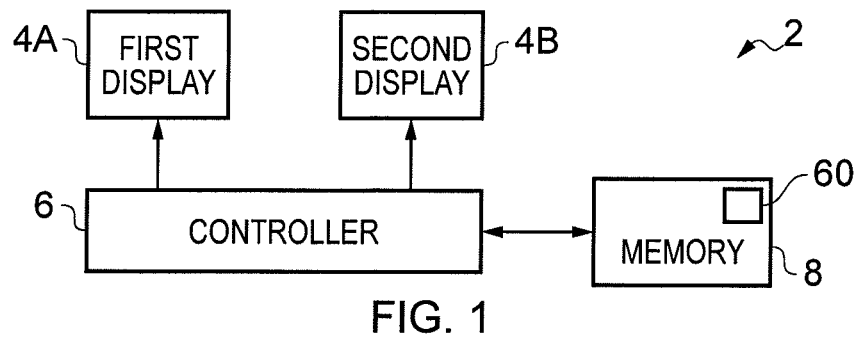
FIG. 1 illustrates an example of an apparatus.

FIG. 1 illustrates an example of an apparatus 2 comprising: a first display 4A defining a first display area 21; a second display 4B defining a second display area 22; and a display controller 6 configured to control display of an interface effect 14 at an interface 16 between the first display area 21 and the second display area 22. The interface effect 14 indicates to a user that a user interface element 10 is movable by the user across the interface 16. An example of the interface effect is illustrated schematically in FIGS. 2A (and 2C).

The apparatus 2 may, for example, be an electronic apparatus such as a personal digital assistant, personal media player, mobile cellular telephone, personal computer, a point of sale terminal etc. In some embodiments the apparatus 2 may be a hand-portable apparatus, that is, an apparatus that is sized to be carried in the palm of a hand or in a jacket pocket.

The display controller 6 is configured to control the first display area 21 to display a user interface element 10 that is movable across the interface 16 from the first display area 21 to the second display area 22. The display controller 6 is also configured to control display of an interface effect 14, at the interface 16. The interface effect 14 is indicative to a user that the user interface element 10 is movable across the interface 16 from the first display area 21 to the second display area 22. In some but not necessarily all embodiments, the interface effect 14 is displayed in the same display area as the user interface element 10.

The display controller 6 may also be configured to control the second display area 22 to display a user interface element 10 that is movable across the interface 16 from the second display area 22 to the first display area 21. The display controller 6 is configured in this situation to control display of an interface effect 14, at the interface 16. The interface effect 14 is indicative to a user that the user interface element 10 is movable across the interface 16 from the second display area 22 to the first display area 21. In some but not necessarily all embodiments, the interface effect 14 is displayed in the same display area as the user interface element 10.

Figure 2A:
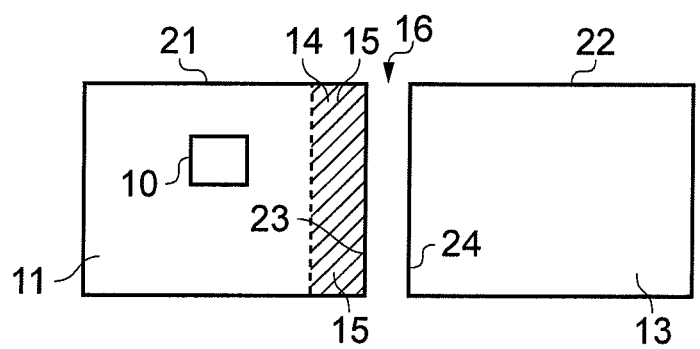
FIG. 2A illustrates a user interface element movable across the interface from the first display area and an interface effect, at the interface in the first display area.
Figure 2B:
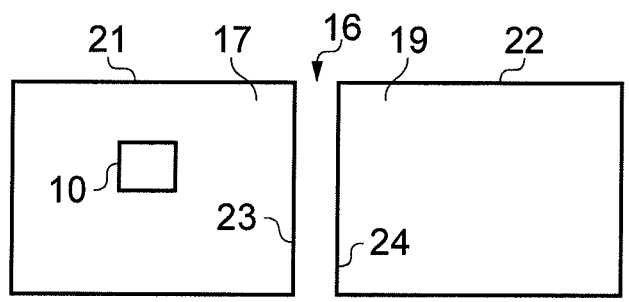
FIG. 2B illustrates a user interface element movable across the interface from the first display area but no interface effect, at the interface in the first display area.
Figure 2C:
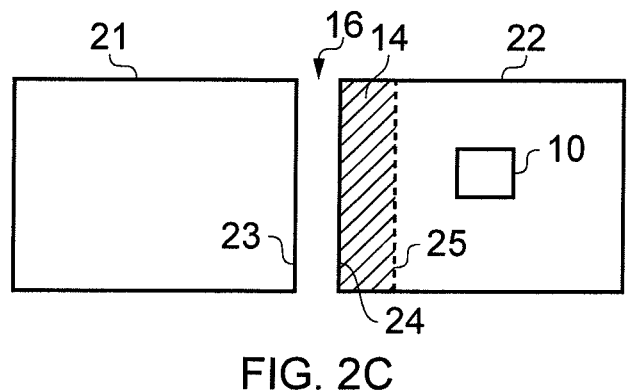
FIG. 2C illustrates a user interface element movable across the interface from the second display area and an interface effect, at the interface in the second display area.

FIGS. 2A, 2B and 2C schematically illustrate a first display area 21; an adjacent second display area 22; and an interface 16 separating the first display area 21 from the second display area 22. A user interface element 10 is movable across the interface 16 from the first display area 21 to the second display area 22 (FIG. 2A) and is movable across the interface from the second display area 22 to the first display area 21 (FIG. 2C). The user interface element 10 is movable in the first display area 21, the second display area 22 and across the interface 16 in response to input from a user.

In this example, the first display area 21 and the second display area 22 are 'landscape' with a width dimension exceeding a height dimension. In other embodiments the first display area 21 and the second display area 22 may be portrait with a width dimension less than a height dimension.

In this example, the first display area 21 and the second display area 22 are the same size. In other embodiments they may be of different size.

The first display area 21 has an edge 23 nearest the second display area 22. The second display area 22 has an edge 24 nearest the first display area 21. The edges 23 and 24 are in this example, but not necessarily all examples, rectilinear and parallel. The distance separating the edges 23, 24 may in some embodiments be less than 5 mm.

In this example, the edges 23, 24 are height-wise edges with the first display area 21 and the second display area side-by-side. However in other embodiments (e.g. FIG. 3), the edges 23, 24 may be width-wise edges with the first display area 21 and the second display area 22 above-below each other.

There is an interface 16 between the edge 23 of the first display area 21 and the edge 24 of the second display area 22. The interface 16 separates the first display area 21 from the second display area 22 and does not operate as a display. The interface 16 in the illustrated example forms a gap where a user interface element 10 cannot be displayed.

FIG. 2A illustrates a user interface element 10 that is movable across the interface 16 from the first display area 21 to the second display area 22 and also an interface effect 14 at the interface 16 in the first display area 21.

FIG. 2B illustrates a user interface element 10 that is movable across the interface 16 from the first display area 21 to the second display area 22 but no interface effect 14 at the interface 16.

FIG. 2C illustrates a user interface element 10 that is movable across the interface 16 from the second display area 22 to the first display area 22 and also an interface effect 14 at the interface 16 in the second display area 22.

In FIGS. 2A, 2B, 2C the display controller 6 is configured to control the first display area 21 to display a first background 11 and to control the second display area 22 to display a second background 13.

In FIG. 2A, the controller 6 controls the first display area 21 to display the user interface element 10 in front of the first background 11 and controls the first display area 21 to display the interface effect 14 in front of a portion 17 of the first background 11 adjacent the interface 16.

In this example, the interface effect 14 replaces a portion 17 of the first background 11 adjacent the interface 16 with a portion 15 of the second background 13. The portion 15 of the second background 13 is different to the portion 17 of the first background 11 it replaces.

The replacement portion 15 of the second background 13 is a new additional portion of the second background 13. It is an add-on to the second background 13 displayed in the second display area 22 and its display in the first display area 21 does not change or alter the display of the second background in the second display area 22.

The replacement portion 15 of the second background 13 may be revealed over a period of time apparently uncovering what was previously invisible and making it visible.

In FIG. 2B, the controller 6 controls the first display area 21 to display the user interface element 10 in front of the first background 11 and controls the first display area 21 to display the portion 17 of the first background 11 adjacent the interface 16 instead of the interface effect 14.

In FIG. 2C, the controller 6 controls the second display area 22 to display the user interface element 10 in front of the second background 12 and controls the second display area 22 to display the interface effect 14 in front of a portion 19 of the second background 13 adjacent the interface 16.

The interface effect 14 replaces the portion 19 of the second background 13 adjacent the interface 16 with a portion 25 of the first background 11 that is different to the portion 19 of the second background 13 it replaces. The replacement portion 25 of the first background 11 is an additional portion of the first background 11. It is an add-on to the first background 11 displayed in the first display area 21 and its display in the second display area 22 does not change or alter the display of the first background 11 in the first display area 21.

The replacement portion 25 of the first background 11 may be revealed over a period of time apparently uncovering was previously invisible and making it visible.

The interface effect 14 may be static or it may be dynamic and change with time.

In the illustrated example of FIG. 2A, the interface effect 14 extends along the edge 23 of the first display area 21 for the complete length of the edge 23.

In the illustrated example of FIG. 2C, the interface effect 14 extends along the edge 24 of the second display area 22 for the complete length of the edge 24.

In FIG. 2A, the interface effect 14 is displayed in a portion of the first display area adjacent the interface 16, the first background 11 is displayed in a portion of the first display area 21 not occupied by the interface effect 14, the user interface element 14 is displayed in front of the first background 11 and the second background is displayed in the second display area 22.

When the user interface element 10 is moved by a user from the first display area 21 to the second display area 22, then as illustrated in FIG. 2C, the interface effect 14 is displayed in a portion of the second display area 22 adjacent the interface 16, the second background 13 is displayed in a portion of the second display area 22 not occupied by the interface effect 14, the user interface element 10 is displayed in front of the second background 13 and the first background 11 is displayed in the first display area 21. The interface effect 14 thus follows the user interface element 10 moving automatically from the first display area 21 to the second display area 22 when the user interface element is moved by a user from the first display area 21 to the second display area 22.

Although a particular type of user interface effect 14 has been described with reference to FIGS. 2A and 2C, it should be appreciated that other different interface effects are possible.

Figure 3:
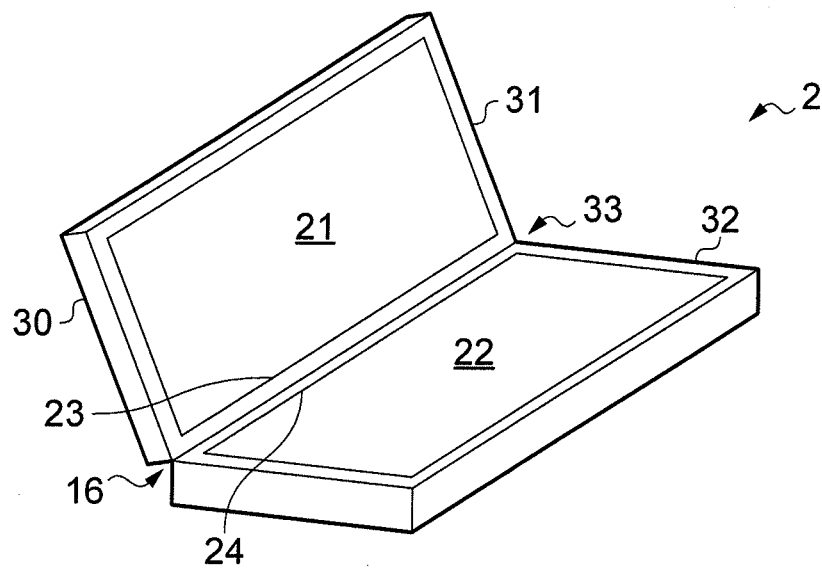
FIG. 3 illustrates in perspective view an example of a dual display apparatus.

FIG. 3 illustrates in perspective view an example of a dual display apparatus 2. In this example the first display area 21 is rotatable relative to the second display area 22 about an axis in the gap 16.

The apparatus 2 comprises a housing 30 that has a first housing part 31 connected to a second housing part 32 via a hinge 33. The first housing part 31 supports the first display 4A defining the first display area 21. The second housing part 32 supports the second display 4B defining the second display area 22.

The straight edge 23 of the first display area 21 nearest the gap 16 is parallel to the straight edge 24 of the second display area 22 nearest the gap 16. Separation between the edges 23, 24 is constant and may be less than 5 mm.

The gap 16 is occupied in this example by a portion of the first housing part 31, the hinge 33 and a portion of the second housing part 32.

The first display 4A and/or the second display 4B may be a touch sensitive display. A touch sensitive display is capable of providing output to a user and also capable of simultaneously receiving touch or proximity input from a user while it is displaying.

A user interface element 10 may be any item that is displayable on a display used as a user interface. It may, for example, be an icon, widget or similar. It may, for example, be an output from an application such as an application window.

The user interface element 10 may be static or dynamic. Static means that it does not change appearance over time. Dynamic means that it changes appearance (shape or color etc) over time.

FIG. 4 schematically illustrates a method 40 for controlling whether or not an interface effect 14 is displayed.

At block 41 it is determined whether or not a user interface element 10 is selected by a user. If the user interface element 10 is selected, the method moves to block 42. If the user interface element 10 is not selected, the method moves to block 45.

At block 42 it is determined whether or not the selected user interface element 10 is movable across an interface 16 separating a first display area 21 from a second display area 22. If the user interface element 10 is moveable from the display area in which it is positioned to the other display area, the method moves to block 43. If the user interface element 10 is not moveable in this way, the method moves to block 45.

At block 43 it is determined whether or not a first criteria concerning a distance of the user interface element 10 from the interface 16 is satisfied. If the first criteria is satisfied, the method moves to block 44. If the first criteria is not satisfied, the method moves to block 45.

Although the term criteria is normally used to indicate more than one criterion, in this document the term 'criteria' should be understood to indicate one or more criterion.

At block 44 the interface effect 14 is displayed in the same display area as the user interface element 10 is located.

At block 45 the interface effects 14 is not displayed.

It should be appreciated that the order of the blocks 41, 42 and 43 may be changed and that any number of the blocks 41, 42, 43 may be omitted. For example, in FIG. 4, block 42 could be replaced by block 44 or block 43 could be replaced by block 44.

When the interface effect 14 is enabled at block 44, the method 40 returns to block 41. Thus the user interface effect 14 is enabled while all the criteria specified by blocks 41-43 are satisfied. When one of the criteria specified by blocks 41-43 are not satisfied the method moves to block 45 and the user interface effect 14 is disabled. The user interface effect 14 may therefore be temporary lasting only while all the criteria specified by blocks 41-43 are satisfied.

When the interface effect is disabled at block 45, the method 40 returns to block 41. Thus the user interface effect 14 is disabled while any of criteria specified by blocks 41-43 is not satisfied. When all of the criteria specified by blocks 41-43 are satisfied the method moves to block 44 and the user interface effect 14 is enabled.

FIG. 5 schematically illustrates examples of a first criteria concerning a distance of the user interface element 10 from the interface 16.

The FIG. illustrates a user interface 10 at a distance D from the edge 23/24 of the display area 21/22 in which the user interface element 10 is displayed. The distance D is the shortest distance between the user interface element 10 and the interface 16.

The first criteria concerning a distance of the user interface element 10 from the interface 16 may, for example, be satisfied when:

a) the shortest distance D between the user interface element 10 and the interface 16 is less than a distance threshold value $T_D$; and/or
b) the change in the shortest distance D between the user interface element 10 and the interface 16 over time exceeds a speed threshold value $T_D'$ That is the first criteria may be $D<T_d$ AND $dD/dt>T_d'$ or $D<T_d$ OR $dD/dt>T_d'$.

According to this first criteria, if the user interface element 10 is moved by a user to be proximal to the interface 16 the interface effect 14 is enabled. When the user interface element 10 is moved by a user to be distal from the interface 16 the interface effect 14 is disabled.

Referring back to FIG. 1, the controller 6 may be implemented using instructions that enable hardware functionality, for example, by using executable computer program instructions in a general-purpose or special-purpose processor that may be stored on a computer readable storage medium (disk, memory etc) to be executed by such a processor.

In an embodiment where the controller 6 is provided using a processor, the processor 6 is configured to read from and write to the memory 8. The processor 6 may also comprise an output interface via which data and/or commands are output by the processor 6 and an input interface via which data and/or commands are input to the processor 6.

The memory 8 stores a computer program 60 comprising computer program instructions that control the operation of the apparatus 2 when loaded into the processor 6. The computer program instructions 60 provide the logic and routines that enables the apparatus to perform the methods illustrated in FIGS. 2A, 2B, 2C, 4 and 5. The processor 6 by reading the memory 8 is able to load and execute the computer program 60.

The apparatus therefore comprises: at least one processor 6; and at least one memory 8 including computer program code 60 the at least one memory 8 and the computer program code 60 configured to, with the at least one processor, cause the apparatus at least to perform:

displaying in a first display area a user interface element that is movable from the first display area to a second display area across an interface between the first display area and the second display area; and displaying an interface effect in the first display area, at the interface, indicative to a user that the user interface element is movable across the interface from the first display area to the second display area.

The computer program may arrive at the apparatus 2 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 60. The delivery mechanism may be a signal configured to reliably transfer the computer program 60. The apparatus 2 may propagate or transmit the computer program 60 as a computer data signal.

Although the memory 8 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user. The controller 6 may be a module.

The blocks illustrated in the FIG. 4 may represent steps in a method and/or sections of code in the computer program 60. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

For example, although the above described examples have used only two distinct display areas, the pair of display areas may be considered as any permutation or combination of two adjacent display areas in a multi-display area system.

Although the interface 16 is illustrated as a narrow gap in some embodiments it may be large, for example larger than a dimension or maximum dimension of a display area. The display areas do not need to be attached to each other. If the pair of display areas are not attached to each other, a mechanism may be provided for measuring the distance between display areas. For example, transmitters and receivers may be used to measure the distance using time of flight estimation.

For example, the apparatus 2 may comprise: means for displaying in a first display area a user interface element that is movable from the first display area to a second display area across an interface between the first display area and the second display area; and means for displaying an interface effect in the first display area, at the interface, indicative to a user that the user interface element is movable across the interface from the first display area to the second display area.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    a first display area;
    a second display area distinct from the first display area;
    a first interface physically separating the first display area from the second display area; and
    a display controller configured to control display in the first display area of a first background and a user interface element and to control display in the second display area of a second background;

the display controller further configured to determine a first distance from the user interface element to the first interface, and to determine if at least one distance criteria of the user interface element is satisfied based on the first distance, and to evaluate at least one further, different criteria to determine if the user interface element is moveable across the first interface from the first display area to the second display area;

the display controller further configured to control display of an interface effect by initially controlling display of the interface effect to appear on the first display area, adjacent to the first interface to indicate to a user that the user interface element is movable across the first interface from the first display area to the second display area upon the at least one distance criteria and the at least one further, different criteria being satisfied, wherein the display controller is configured to control the displayed interface effect to move automatically from the first display area to the second display area when the user interface element is moved by a user from the first display area to the second display area such that the moved displayed interface effect in the second display area is displayed in addition to the moved interface element on the second display area, adjacent to the first interface;

and wherein when the interface effect is controlled to move to the second display area the interface effect replaces a portion of the second background.

2. An apparatus as claimed in claim 1, wherein the interface effect is displayed in the first display area.

3. An apparatus as claimed in claim 2, wherein the display controller is configured to control the first display area to display the user interface element in front of the first background, and to control the first display area to display the interface effect in front of a portion of the first background adjacent the first interface.

4. An apparatus as claimed in claim 3, wherein the interface effect replaces the portion of the first background adjacent the first interface with a portion of the second background that is different to the portion of the first background it replaces.

5. An apparatus as claimed in claim 4, wherein the replacement portion of the second background is an additional portion of the second background additional to the second background displayed in the second display area and wherein the display of the replacement portion of the second background in the first display area does not change the display of the second background in the second display area.

6. An apparatus as claimed in claim 5, wherein the additional portion of the second background is revealed over a period of time.

7. An apparatus as claimed in claim 1, wherein the interface effect extends along the first display area for a length of the interface.

8. An apparatus as claimed in claim 1, wherein the interface effect is enabled when the user interface element is selected by a user and wherein the interface effect is disabled when the user interface element is de-selected by a user.

9. An apparatus as claimed in claim 1 wherein the interface effect is enabled when a first criteria dependent upon a distance of the user interface element from the first interface is satisfied and disabled when a first criteria dependent upon a distance of the user interface element from the first interface is not satisfied.

10. An apparatus as claimed in claim 9, wherein the first criteria concerning a distance of the user interface element from the first interface is satisfied when the shortest distance between the user interface element and the first interface is less than a distance threshold value and/or when a change in the distance between the user interface element and the first interface over time exceeds a speed threshold value.

11. An apparatus as claimed in claim 9, wherein when the user interface element is moved by a user from the first display area to the second display area the interface effect is enabled in the second display area until the distance criteria is not satisfied by the user interface element on the second display area.

12. An apparatus as claimed in claim 1, wherein the first display area and the second display area are touch sensitive input areas.

13. An apparatus as claimed in claim 1, wherein the interface effect follows the user interface element.

14. A method comprising:
displaying in a first display area a first background and a user interface element;
displaying in a second display area a second background, wherein the second display area is distinct from the first display area, and there is a first interface between the first display area and the second display area, wherein the first interface physically separates the first display area from the second display area;
determining a first distance from the user interface element to the first interface;
determining if at least one distance criteria of the user interface element is satisfied based on the first distance;
evaluating at least one further, different criteria to determine if the user interface element is movable across the interface from the first display area to the second display area; and
displaying an interface effect, by initially displaying the interface effect to appear on the first display area, adjacent to the first interface to indicate to a user that the user interface element is movable across the interface from the first display area to the second display area upon the at least one distance criteria and the at least one further, different criteria being satisfied, wherein the displayed interface effect moves automatically from the first display area to the second display area when the user interface element is moved by a user from the first display area to the second display area such that the moved displayed interface effect in the second display area is displayed in addition to the moved interface element on the second display area, adjacent to the first interface,
and wherein when the interface effect moves to the second display area the interface effect replaces a portion of the second background.

15. A method as claimed in claim 14, comprising:
displaying the interface effect in a portion of the first display area adjacent the first interface;
displaying a first background in a portion of the first display area not occupied by the interface effect;
displaying the user interface element in front of the first background; and
displaying a second background in the second display area.

16. A method as claimed in claim 15, wherein the interface effect comprises an additional portion of the second background that is different to the portion of the first background it replaces and is additional to the second background displayed in the second display area.

17. A method as claimed in claim 14, wherein the interface effect changes with time.

18. A method as claimed in claim 14, wherein the interface effect is enabled when the user interface element is selected by a user and disabled when the user interface element is de-selected by a user.

19. A method as claimed in claim 14, when the user interface element is moved by a user from the first display area to the second display area, the method comprising:
  displaying the interface effect in a portion of the second display area adjacent the first interface;
  displaying a second background in a portion of the second display area not occupied by the interface effect;
  displaying the user interface element in front of the second background; and
  displaying a first background in the first display area.

20. An apparatus comprising:
  at least one processor; and
  at least one memory including computer program code,
  the at least one memory and the computer program code configured to, with the at least one processor, cause the apparatus at least to perform:
  displaying in a first display area a first background and a user interface element; displaying in a second display area a second background, wherein the second display area is distinct from the first display area, and there is a first interface between the first display area and the second display area, wherein the first interface physically separates the first display area from the second display area;
  determining a first distance from the user interface element to the first interface;
  determining if at least one distance criteria of the user interface element is satisfied based on the first distance;
  evaluating at least one further, different criteria to determine if the user interface element is movable across the first interface from the first display area to the second display area; and
  displaying an interface effect by initially displaying the interface effect to appear on the first display area, adjacent to the first interface to indicate to a user that the user interface element is movable across the first interface from the first display area to the second display area upon the at least one distance criteria and the at least one further, different criteria being satisfied, wherein the displayed interface effect moves automatically from the first display area to the second display area when the user interface element is moved by a user from the first display area to the second display area such that the moved displayed interface effect in the second display area is displayed in addition to the moved interface element on the second display area, adjacent to the first interface,
  and wherein when the interface effect moves to the second display area the interface effect replaces a portion of the second background.

* * * * *